United States Patent [19]

Brunel

[11] Patent Number: 4,976,236
[45] Date of Patent: Dec. 11, 1990

[54] FUEL INJECTION PUMP

[75] Inventor: André Brunel, Genis Laval, France

[73] Assignee: Robert Bosch GmbH, Stuttgart, Fed. Rep. of Germany

[21] Appl. No.: 296,219
[22] PCT Filed: Jun. 11, 1988
[86] PCT No.: PCT/DE88/00353
§ 371 Date: Nov. 21, 1988
§ 102(e) Date: Nov. 21, 1988
[87] PCT Pub. No.: WO89/00243
PCT Pub. Date: Jan. 12, 1989

[30] Foreign Application Priority Data

Jul. 6, 1987 [DE] Fed. Rep. of Germany ....... 3722265

[51] Int. Cl.$^5$ ............................................. F02M 39/00
[52] U.S. Cl. ..................... 125/300; 123/450; 123/447
[58] Field of Search ............... 123/299, 300, 450, 506, 123/447

[56] References Cited

U.S. PATENT DOCUMENTS

| 4,033,314 | 7/1977 | Walton | 123/299 |
| 4,273,087 | 6/1981 | Goloff | 123/299 |
| 4,295,449 | 10/1981 | Cemenska | 123/450 |
| 4,450,813 | 5/1984 | Takano | 123/450 |
| 4,696,271 | 9/1987 | LeBlanc | 123/450 |
| 4,718,384 | 1/1988 | Takahashi | |
| 4,840,162 | 6/1989 | Brunel | 123/450 |

FOREIGN PATENT DOCUMENTS 3617786 12/1986 Fed. Rep. of Germany.

*Primary Examiner*—Carl Stuart Miller
*Attorney, Agent, or Firm*—Striker, Striker & Stenby

[57] ABSTRACT

A fuel injection pump comprising a pump piston comprising a pump working space communicating with a fuel supply space and an injection nozzle of an internal combustion engine to be filled with fuel during a pump piston intake stroke and to provide for flow of delivery fuel to the injection nozzle during a pump piston delivery stroke, a first pilot valve for controlling a quantity of fuel delivered to the injection nozzle and an arrangement for dividing the delivered quantity into preliminary and main quantities, the dividing arrangement comprising an assembly for venting a portion of fuel from the pump working chamber during the pump piston delivery stroke and a second pilot valve for controlling an amount of fuel vented from the pump working chamber.

17 Claims, 4 Drawing Sheets

FUEL INJECTION PUMP

BACKGROUND OF THE INVENTION

The invention relates to a fuel injection pump for internal-combustion engines.

German Offenlegungsschrift No. 2,903,482 and German Patent Application No. P 36 12 942.9, disclose a fuel injection pump in which the fuel quantity delivered to an injection nozzle during the delivery stroke of the pump piston is injected into the cylinder of the internal-combustion engine during a single opening phase of the injection nozzle. The delivery period, and thus the injected fuel quantity, is determined by the closing and opening instants of the electric pilot valve. With closing of the pilot valve, the pump working space is closed off, so that the delivery pressure builds up with the pump piston stroke, and with opening of the pilot valve, the pump working space is connected to a relief space, which causes the pressure in the pump working space to drop abruptly, which closes the injection nozzle and thus the injection is ended.

In the case of diesel engines, this so-called direct injection causes considerable noise problems, in particular during idling and at low speeds, due to the abrupt combustion of the injected mixture. A notable reduction in noise is achieved however by dividing the fuel injection quantity into a smaller preliminary injection quantity and a main injection quantity, dependent on the speed and load of the internal-combustion engine, as is known for example from German Offenlegungsschrift No. 3,444,234 or German Offenlegungsschrift No. 3,511,492.

In German Offenlegungsschrift No. 3,444,234, with a distributor fuel injection radial piston pump during the delivery stroke, turning of the distributor piston brings about a controlled opening of the relief opening, which connects the pump working space to an accumulator space of a predetermined volume. In this arrangement, during the delivery stroke, a constant delivery volume is branched off from the delivery quantity displaced to the injection nozzle. As a result, the delivery pressure in the pump working space drops to below the opening pressure of the injection nozzle and thereby closes the latter. The fuel preliminary injection is thus ended. With delivery pressure increasing again upon further delivery stroke of the pump piston, the injection nozzle opens again and the remaining fuel injection quantity is injected during the main injection phase. The main injection phase is ended as soon as the turning distributor piston opens a control opening leading to the fuel supply space.

According to German Offenlegungsschrift No. 3,511,492, in the case of a distributor fuel injection axial piston pump, an accumulator space with constant storage volume connected to the pump working space is relieved by an electric pilot valve during the delivery stroke of the pump piston. Due to the pressure drop brought about thereby in the pump working space, the injection nozzle is closed and the preliminary injection ended. The end of the main injection is fixed by the position of an annular slide valve displaceable over the pump piston, which valve opens a relief opening at a certain stroke position of the pump piston.

In the case of the two last-described known fuel injection pumps, in contrast to the first-described injection pumps, the overall injected fuel quantity is not fixed by an electric pilot valve, but mechanically by the rotational position of the distributor piston or by the axial position of the annular slide valve.

SUMMARY OF THE INVENTION

The object of the present invention is to provide fuel injection pump according to the invention having a structurally simple control of delivery beginning and end by an electric pilot valve, and which also permits to achieve division of preliminary and main injection quantities in a simple way. Both, delivery end and the duration and instant of the preliminary and main injections can be changed at any time without structural intervention and can thus be adapted easily to given parameters, such as speed, delivery pressure and needle stroke of the injection nozzle. The fuel injection pump according to the invention is characterized by small overall volume and easy exchangeability of the pilot valves. The same valve type can be used for both pilot valves.

Advantageous developments and improvements of the fuel injection pump specified in claim 1 are possible by the measures listed in the further claims.

In the case of the embodiments of the invention according to claims 2–7, there is the possibility of making the time interval between the end of the preliminary injection and the beginning of the main injection extremely small, as neither of the two pilot valves is reversed successively, i.e. has to execute an opening movement immediately after a closing movement, or vice versa. The instant of the beginning of main injection can be set by presetting the accumulator piston stroke, which can be adjusted for example by means of an adjustable stroke stop.

In the case of the embodiments of the invention according to claims 5 and 6, a dead volume caused by the control space for the accumulator piston can be kept very small.

An advantageous embodiment of the invention also arises from claim 8. The direct removal of a delivery volume by closing and opening of the second pilot valve without use of an accumulator space with predetermined storage volume makes possible a control of the preliminary injection without affecting the frequency of the first pilot valve determining the delivery period. The preliminary injection can be set completely independently of the main injection and without retroactive effect on the latter. It is possible to perform both only a preliminary injection for low speeds—in other words without following subsequent main injection—and a direct injection at high speeds—in other words without division of the fuel injection quantity into preliminary and main injections. In the first case, after opening of the second pilot valve for ending of the preliminary injection, the said valve is not closed again and, in the second case, the second pilot valve is actuated synchronously with the first pilot valve. In both cases, the operating frequency of the first pilot valve, in other words the instant of a beginning of the delivery and the instant of an end of the delivery remains uninfluenced by the fixing of the preliminary injection. In the event of failure of one of the two pilot valves, an emergency stop can additionally be effected by opening of the intact pilot valve.

The invention as to its construction so to its method of operation, together with additional objects and advantages thereof, will be best understood from the following description with reference to the accompanying drawings.

DESCRIPTION OF THE PREFERRED EMBODIMENTS

Figure 1:
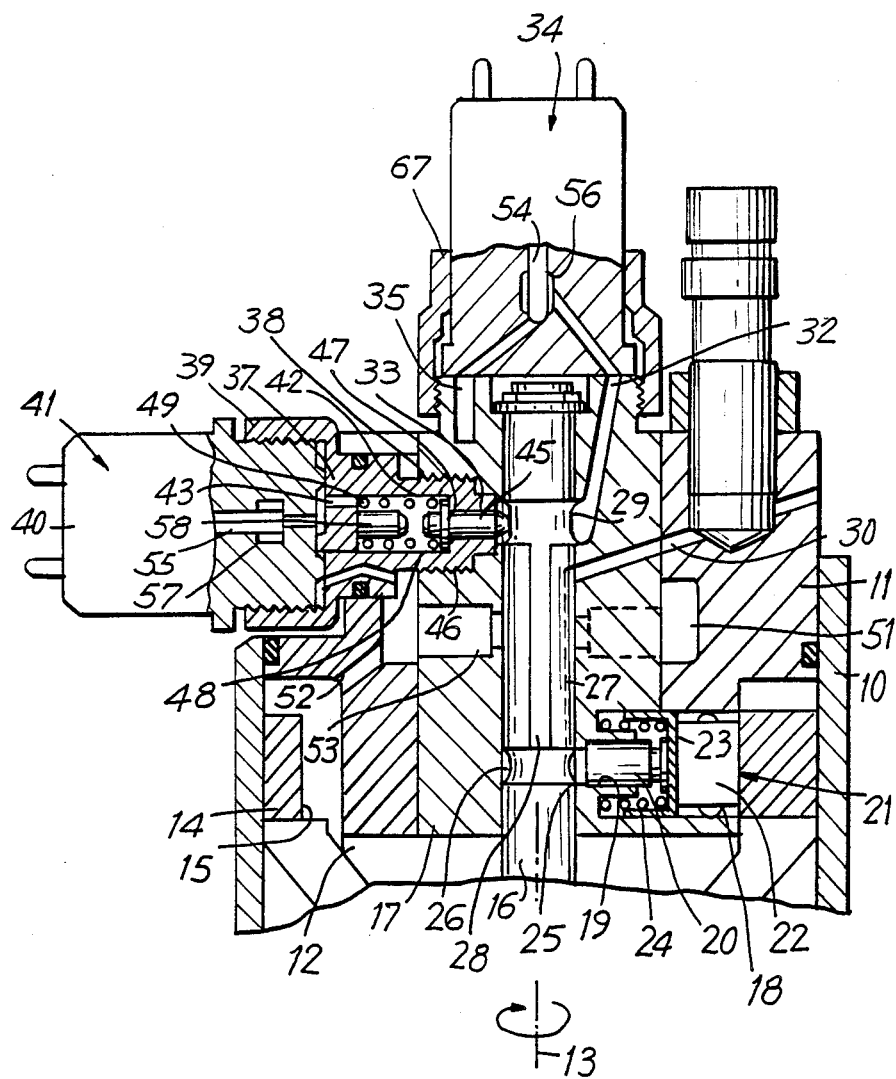
FIG. 1 shows a partial longitudinal cross-sectional view of a distributor fuel injection radial piston pump according to the present invention.

A distributor fuel injection radial piston pump shown section in FIG. 1, has a cup-shaped casing 10 and a cover 11 closing the latter. The cover cover is pushed in from the open end of the casing 10 and with a base (not shown) of the casing 10 limits a pump inner space 12. The pump inner space 12 is filled with a fuel under low pressure and serves as fuel supply and relief space. A drive shaft 13 defined in FIG. 1 by its axis extends through the base of the casing 10. In the pump inner space 12, the drive shaft 13 wide n the shape of a cup and carries along its rim a cam ring 14 connected to rotate with it. The cam ring 14 has on an inner surface thereof a cam track 15 with radially inward-directed cams. The cams are adapted in number and sequence to the number and sequence of radial pistons contained in the fuel injection pump and to the number of piston strokes to be executed with this radial piston per revolution of the drive shaft 13. Usually seated on the drive shaft 13 is the delivery pump (not shown), which fills the pump inner space 12 with the fuel.

Also connected to the drive shaft 13, to rotate with it, is a distributor piston 16, the axis of which is in alignment with the axis of the drive shaft 13. The distributor piston 16 is guided, apart from the end connected to the drive shaft 13, in a distributor cylinder 17, which is held in a bore of the cover 11 coaxial to the axis of the drive shaft 13. The distributor piston 16 is fixed in its axial position in the distributor cylinder 17. Alongside the cam track 15, adjoining radially inwards, there are provided in the cover 11 and in the distributor cylinder 17 guides 18, which are evenly distributed around periphery and reach almost up to the distributor piston 16. In a distributor fuel injection pump shown in FIG. 1 for supplying a total of three injection nozzles of an internal-combustion engine, in particular of a diesel engine, a total of three guides 18 are provided of which only one can be seen in FIG. 1. Provided coaxially to the guides 18, there are in the distributor cylinder 17 radial through-bores 19, in which a pump piston 20 is guided longitudinally displaceably in each case. In the guides 18, a so-called roller shaft 21 is guided longitudinally displaceably in each case, which roller shaft consists of a roll or roller 22 and a shaft cup 23. A shaft spring 24, bearing at one end against the base of the shaft cup 23 and, at the bottom of the guide 18, against the distributor cylinder 17 at the other end, biases the shaft cup 23 against the roller 22 and the latter against the cam track 15 of the cam ring 14.

Each pump piston 20 confines in the radial through-bore 19 a pump working space 25, the other end of which is limited by a first annular groove 26 on the distributor piston 16. A distributor groove 27 extending axially on the distributor piston 16 communicates with the annular groove 27. A connecting groove 28 extends parallel to the distributor groove 27. The connection groove 28 leads to a second annular groove 29 which is axially spaced in the distributor piston 16 from the first annular groove 26. Injection bores 30 evenly distributed around their periphery of the distributor cylinder 17 extend through a wall of the distributor cylinder 17 and the cover 11 up to an injection nozzle in each case and open out in a cross-sectional plane. The axial length of the distributor groove 27 is dimensioned such that it extends into the cross-sectional plane of mouths of the injection bores 30 and, thus, connects one of the three injection bores 30 to the first annular groove 26, depending on the rotational position of the distributor piston 16. In the region of the second annular groove 29, a feed bore 32 and a radial stepped bore 33 open into the inside of the distributor cylinder 17. The feed bore 32 is connected to a valve port of a first electromagnetic pilot valve 34, the other valve port of which is connected to a discharge bore 35 extending in the distributor cylinder 17 into the pump inner space 12. The valve casing 36 of the first pilot valve 34 while sealing off the cylinder bore of the distributor cylinder 17, is, in this case, mounted on the end face of the distributor cylinder 17 and is secured to the distributor cylinder 17 by a union nut 67.

Screwed into the radial stepped bore 33 by a threaded pin 38, there is a casing 37 carrying on its side remote from the threaded pin 38 a hollow-cylindrical collar 39 in which the valve casing 40 of a second electromagnetic pilot valve 41 is received. The casing 37 has a longitudinally continuous stepped bore 42, also extending over the region of the threaded pin 38, which stepped bore is closed at the end facing the valve casing 40 by a plug 44 provided with an axial bore 43. In the bore section having the smaller bore diameter of the stepped bore 42, there is guided axially displaceably an accumulator piston 45, which, together with the second annular groove 29, confines an accumulator space 46 in the distributor piston 16. The accumulator piston 45 reaches into the bore section having the greater bore diameter of the stepped bore 42 and confines here, with a radial flange 47, a control space 48, closed by the plug 44, for the accumulator piston 45. The accumulator piston 45 is pretensioned by a return spring 49 which bears at one end against the plug 44 and at the other end against the radial flange 47 in its basic position drawn in FIG. 1, in which the accumulator volume of the accumulator space 46 is minimal and practically equal to zero apart from a small dead volume. The return spring 49, designed as a helical compression spring, is seated on a guide pin which is integral with the plug 44 and at the same time forms a stroke stop 58 for the accumulator piston 45. By screwing in the plug 44 to a greater or lesser extent—after removal of the pilot valve—the maximum stroke of the accumulator piston 45, and thus the beginning of the main injection, can be set. The control space 48 is in connection via the axial bore 43 with a valve connection of the second pilot valve 41.

Another valve connection of the second pilot valve is connected via a connecting bore 50 extending in the valve casing 40, to an annular groove 51 which surrounds the distributor cylinder 17. The annular groove 50 is connected for its part via an oblique bore 52 extending in the cover 11 to the pump inner space 12. In the region of the annular groove 51, there are arranged in the distributor cylinder 17 three filling bores 53, evenly distributed around the periphery, via which bores the pump working space 25 can be filled during the intake stroke of one of the pump pistons 20 whenever the connecting groove 28 between the first and second annular grooves 26 and 29 on the distributor piston 16 overlaps one of filling bores 53. The two pilot valves 34, 41 are of identical design. They control, in each case with a valve member 54 and 55, respectively, activated by an electromagnet, a valve opening 56 and 57, respectively, via which the two valve connections are in each case in connection with each other. The design and operating principle of the pilot valves 34, 41 are described in detail in German Offenlegungsschrift No. 3,523,536.

Figure 2:
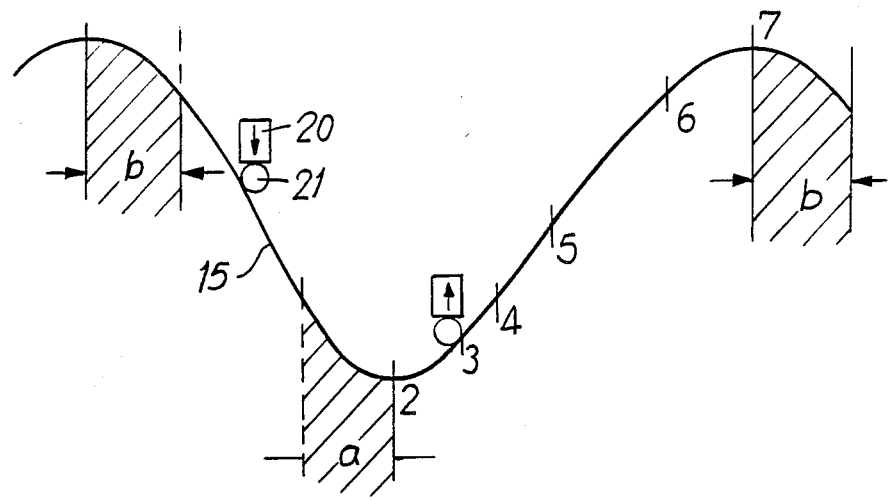
FIG. 2 shows a partial diagram of a development of a cam track of the fuel injection pump in FIG. 1 to clarify the operating principle.
Figure 3:
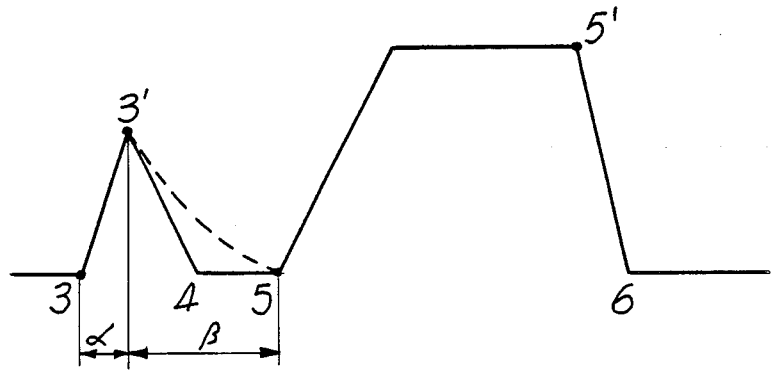
FIG. 3 shows a diagram of a variation over time of a delivery pressure in the pump working space of the fuel injection pump of FIG. 1.

The operating principle of the fuel injection pump described above is explained below with reference to FIGS. 2 and 3, FIG. 2 showing a diagram of a development of the cam track 15, which effects an intake stroke and delivery stroke of the pump piston 20. In FIG. 3, the variation over time of the delivery pressure occurring in the pump working space during the delivery stroke of the pump piston 20 is shown.

On the falling flank of the cam track 15, against which the roller shaft 21 rests, the corresponding pump piston 20 in FIG. 1 moves outwards. The connecting groove 28 overlaps a filling bore 53 and the pump working space 25 is filled with fuel from the pump inner space 12 via the oblique bore 52, the annular groove 51, the filling bore 53, the connecting groove 28 and the annular groove 26. At the latest when the roller shaft 21 reaches the point 1 on the cam track 15, the accumulator piston 45 assumes its basic position, shown in FIG. 1, in which the accumulator volume of the accumulator space 46 is virtually zero. In the region a between the point 1 and the point 2 on the cam track 15, the second pilot valve 41 is closed. The actuation of the pilot valves 34, 41 takes place in this case via a control device (not shown). If the roller shaft 21 passes beyond the point 2 the lower dead centre of the pump piston 20, into the region of the rising flank of the cam track 15, the delivery stroke of the pump piston 20 begins. If the roller shaft 21 has reached point 3, the first pilot valve 34 is closed. Then, with increasing delivery pressure (cf. FIG. 3), fuel is delivered via the first annular groove 26, the distributor groove 27 and the currently connected injection bore 30 to an injection nozzle. The same delivery pressure in the pump working space 25 is available at the accumulator piston 45, via the first annular groove 26, the connecting groove 28 and the second annular groove 29. Due to the closed second pilot valve 41 and the consequently closed-off, fuel-filled control space 48, the accumulator piston 45 is locked, so that the delivery pressure cannot push the latter back.

At the instant 3' (FIG. 3), the excitation of the second pilot valve 41 is turned off. The latter opens and, as a result, the control space 48 is connected via the axial bore 43, the connecting bore 50, the annular groove 51 and the oblique bore 52 to the pump inner space 12. The delivery pressure available at the accumulator piston 45 displaces the accumulator piston so that the volume of the accumulator space 46 increases. The pressure in the pump inner space 25 thus drops continuously. At the instant 4, at which the roller shaft has reached the point 4 of the cam track, the additional accumulator volume of the control space 48 has caused the delivery pressure in the pump working space 25 to drop below the opening pressure of the injection nozzle, so that the latter closes and the preliminary injection is ended. The region of the preliminary injection between the positions 3 and 4 of the roller shaft 21, and of the pump piston 20, relative to the cam track 15 is emphasized in FIG. 2 by more prominent marks. A further inward movement of the pump piston on the rising flank of the cam track 15 from the point 4 up to the point 5 is not accompanied by any delivery pressure increase, as the accumulator piston 45 increasingly gives way and thus the additional space volume connected to the pump working space 25 increases. If the roller shaft 21, and thus the pump piston 20, has reached point 5 on the cam track 15, the accumulator piston 45 reaches its stroke stop 58, which ends its displacement movement. The delivery pressure then increases again above the opening pressure of the injection nozzle and, at the instant 5 (FIG. 3), fuel is again injected via the injection nozzle into the cylinder of the internal-combustion engine. At the instant 5', the actuation of the first pilot valve 34 is neutralized, as a result of which the latter opens. Consequently, the pump working space 25 is connected via the first annular groove 26, the connecting groove 28, the second annular groove 29, the feed bore 32 and the discharge bore 35 to the pump inner space 12 and, as a result, the pump working space 25 is abruptly relieved. The delivery pressure drops extremely quickly to below the opening pressure of the injection nozzle, which closes at the instant 6 (FIG. 3), at which the roller shaft 21, and the pump piston 20, has reached the point 6 on the cam track 15 (FIG. 2). The region of the main injection between the positions 5 and 6 of the roller shaft 21, and of the pump piston 20, relative to the cam track 15 is emphasized in FIG. 2 by more prominent marks. At the point 7, the pump piston 20 has reached its upper dead centre, so that then its movement direction is reversed and it again executes an intake stroke on the falling flank of the cam track 15. In the region b of the cam track (FIG. 2), the pressure in the pump working space 25, and in the second annular groove 29, has dropped so far that the return spring 49 pushes the piston back into its initial position, shown in FIG. 1.

By designing the axial bore 43 connecting the control space 46 to the valve connection of the second pilot valve 41 as a throttle or by providing a throttle at any point between the control space 48 and the pump inner space 12, for example in the connecting bore 50 extending in the casing body 37, the fuel discharge from the control space 48 can be throttled in such a way that the reduction in the delivery pressure after opening of the second pilot valve 41 at the instant 3' (FIG. 3) takes a desired course, as is shown for example in FIG. 3 by broken lines (cf. region $\beta$ therein).

Figure 4:
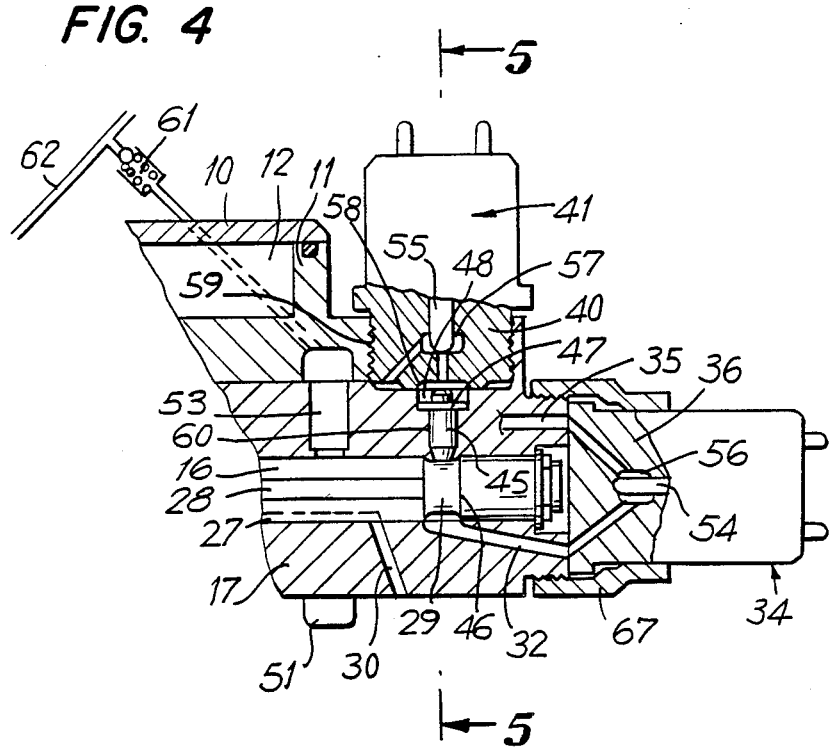
FIG. 4 shows a partial longitudinal cross-sectional view of a fuel injection pump according to a another embodiment.
Figure 5:
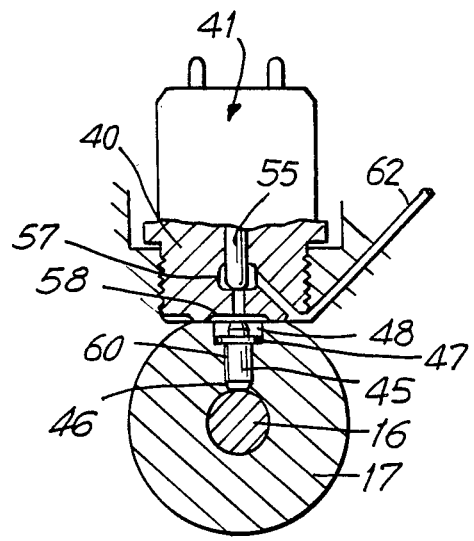
FIG. 5 shows a cross-sectional view along the line V—V in FIG. 4.

In the case of the modified embodiment of a distributor fuel injection pump, shown in FIGS. 4 and 5, the casing body 37 enclosing accumulator space 46 and control space 48 is omitted and the second pilot valve 41 is screwed with its valve casing 40 directly into a radial threaded bore 59 in the cover 11, reaching up to the distributor cylinder 17. The accumulator piston 45, again bearing a radial flange 47, is displaceably mounted directly in a radial stepped bore 60 in the distributor cylinder 17, which bore opens out in the second annular groove 29 on the distributor piston 16. The bore section having the greater bore diameter of the stepped bore 60 forms the control space 58, while the bore section having the smaller diameter of the stepped bore 60 defines the accumulator space 46 during displacement of the accumulator piston 45. The return spring 49 illustrated in FIG. 1 has been omitted. The return of the accumulator piston 45 during the intake stroke of the pump piston 20 is ensured here by the fact that the pressure prevailing in the control space 48 exerts on the accumulator piston 45 a greater force of displacement than the filling pressure prevailing in the pump working space 25, and thus in the second annular groove 29. This may be realized either by a corresponding design of the piston surfaces of the accumulator piston 45 confining the control space 48 at one end, and the accumulator space 46 at the other end, or by corresponding valve means between the pump inner space 12 and the second pilot valve 41 and/or the pump inner space 12 and the annular groove 51 in the cover 11. In the embodiment in FIGS. 4. and 5, these valve means are indicated diagrammatically by a pressure-reducing valve 61, which connects the pump inner space 12 to the annular groove 51, while the second pilot valve 41 is connected directly to the pump inner space 12 via a feed line indicated by 62. This pressure reducing valve 61 ensures, during the intake stroke of the pump piston, fuel pressure in the control space 48 which exceeds the filling pressure in the pump working space 25, so that the accumulator piston 45 is reliably returned to its basic position, shown in FIGS. 4 and 5. Otherwise, the design and operating principle of this distributor fuel injection pump do not differ from that in FIG. 1, so the same reference symbols have been used here for the same components.

Figure 6:
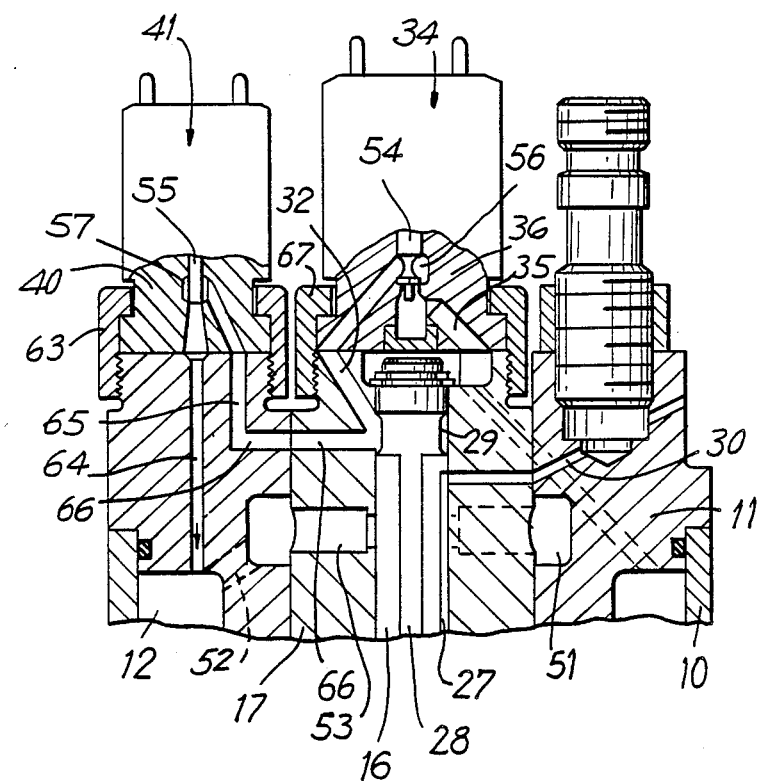
FIG. 6 shows a partial longitudinal cross-sectional view of the fuel injection pump according to a third embodiment.

In the case of the further exemplary embodiment of the distributor fuel injection pump, shown in partial longitudinal section in FIG. 6, the accumulator space 46 with accumulator piston 45 and control space 48 have been omitted completely. The reduction of the fuel volume during the delivery stroke of the pump piston 20 for ending the preliminary injection is effected directly by opening and closing of the second pilot valve 41. The second pilot valve 41 is screwed by a union nut 63 onto a projection of the cover 11 having an outer thread. Its one valve connection is connected via a first bore 64, in the cover 11 to the pump inner space 12. Its other valve connection is connected via a second bore 65, running in the cover 11, and a radial through-bore 66 in the distributor cylinder 16 to the second annular groove 29 on the distributor piston 16. The remaining structural design of the distributor fuel injection pump corresponds to that in FIG. 1.

The operating principle of the fuel injection pump according to FIG. 6 is described briefly below with reference to FIGS. 2 and 3:

During the intake stroke, the second pilot valve 41 is closed. At the instant 3 (FIG. 3), the first pilot valve 34 is closed. The preliminary injection begins. At the instant 3', the second pilot valve 41 is opened. The delivery pressure drops and, at the instant 4, closes the injection nozzle due to the drop of the delivery pressure below the opening pressure of the injection nozzle 31. The preliminary injection is ended. At the instant 5, the second pilot valve 41 is again closed, so that, with further delivery stroke of the pump piston 20, fuel is again delivered to the injection nozzle, where it undergoes injection. At the instant 5', the first pilot valve 34 is opened and the delivery pressure is consequently reduced abruptly. At the instant 6, the main injection is ended. As is readily evident, the preliminary injection can be altered without influencing the main injection, simply by choice of the opening and closing instants of the second pilot valve 41. It is likewise evident that it is possible to dispense completely with the main injection, for example during idling or at low speeds, by dispensing with the reclosing of the second pilot valve 41 at the instant 5. It is also readily possible to perform direct injection at high speeds, by the second pilot valve 41 being switched synchronously with the first pilot valve 34, in other words both pilot valves 34, 41 are closed at the instant 3 and are opened at the instant 5'.

The invention is not restricted to the described and illustrated embodiments of a distributor fuel injection radial piston pump. It can be used in the same way in the case of distributor fuel injection axial piston pumps described in German Offenlegungsschrift No. 3,511,492, or in the case of fuel injection pumps designed as so-called monobloc pump and nozzle units in German Offenlegungsschrift 2,903,482.

The foregoing fully reveals the gist of the present invention so that others can, by applying current knowledge, readily adapt it for various other applications without omitting features that, from the standpoint of prior art, fairly constitute essential characteristics of the generic or specific aspects of this invention.

What is claimed as new and desired to be protected by Letters Patent is set forth in the appended claims:

1. A fuel injection pump for an internal combustion engine having at least one injection nozzle, and fuel injection valve comprising:
   at least one pump piston confining a pump working space;
   first conduit means for communication said pump working space with a fuel supply space for filling said pump working space with fuel during a pump piston intake stroke;
   second conduit means for communicating said pump working space with the injection nozzle for delivering a quantity of fuel to the injection nozzle during a pump piston delivery stroke;
   a first pilot valve for controlling a quantity of fuel delivered to the injection nozzle; and
   means for dividing the quantity of fuel delivered to the injection nozzle into a preliminary fuel quantity and a main fuel quantity, said dividing means comprising:
   means for venting a portion of fuel from said pump working chamber during the pump piston delivery stroke, and
   a second pilot valve for controlling an amount of fuel vented from said pump working chamber,
   cam drive means for reciprocally displacing said pump piston to cause said pump piston to execute the intake and delivery strokes;
   said venting means comprising an accumulator space, a control space, an accumulator piston having a first end face for confining said accumulator space and a second end face opposite to said first end face for confining said control space, said fuel injection pump further comprising means for communicating said control space with the fuel supply space and including first means for communicating said control space with said second pilot valve and second means for communicating said second pilot valve with the fuel supply space.

2. A fuel injection pump for an internal combustion engine having at least one injection nozzle, said fuel injection valve comprising:
 at least one pump piston confining a pump working space;
 first conduit means for communicating said pump working space with a fuel supply space for filling said pump working space with fuel during a pump piston intake stroke;
 second conduit means for communicating said pump working space with the injection nozzle for delivering a quantity of fuel to the injection nozzle during a pump piston delivery stroke;
 a first electric pilot valve for controlling a quantity of fuel delivered to the injection nozzle; and
 means for dividing the quantity of fuel delivered to the injection nozzle into a preliminary fuel quantity and a main fuel quantity, said dividing means comprising:
 means for venting a portion of fuel from said pump working chamber during the pump piston delivery stroke, and
 a second electric pilot valve for controlling an amount of fuel vented from said pump working chamber, said second electric pilot valve closing at beginning of delivery and opening for ending of the preliminary injection.

3. A fuel injection pump according to claim 2 further comprising cam drive means for reciprocally displacing said pump piston to cause said pump piston to execute the intake and delivery strokes.

4. A fuel injection pump according to claim 1 further comprising a stop located in said control space for limiting a stroke of said accumulator piston.

5. A fuel injection pump according to claim 1 further comprising a return spring for biasing said accumulator piston to a position in which a volume of said accumulator space is at its minimum; and means for communicating said accumulator space with said pump working chamber, said return spring force which is smaller than a displacement force exerted by a delivery pressure in said pump working space on said accumulator piston.

6. A fuel injection pump according to claim 1 further comprising means for communicating said accumulator space with said pump working space, said accumulator space and said control space being formed such that a fuel pressure in said control space induces a greater displacement of said accumulator piston than a fuel pressure in said accumulator space and which corresponds to an intake pressure in said pump working space.

7. A fuel injection pump according to claim 1 further comprising means for communicating said accumulator space with said pump working space, said accumulator piston being formed such that a fuel pressure in said control space induces a greater displacement of said accumulator piston than a fuel pressure in said accumulator space and which corresponds to an intake pressure in said pump working space.

8. A fuel injection pump according to claim 1 further comprising means for communicating said accumulator space with said pump working space, said accumulator space, said control space, and said accumulator piston being formed such that a fuel pressure in said control space induces a greater displacement of said accumulator piston than a fuel pressure in said accumulator space and which corresponds to an intake pressure in said pump working space.

9. A fuel injection pump according to clam 1 further comprising valve means for rendering the fuel pressure in said control space greater than in said accumulator space.

10. A fuel injection pump according to claim 1 further comprising a throttle located in said means for communicating said control space with the fuel supply space.

11. A fuel injection pump according to claim 2 further comprising means for communicating said second pilot valve with said pump working space and means for communicating said second pilot valve with a relief space, said second pilot valve being formed to be closed at the beginning of the pump piston delivery stroke, to open to end the delivery of the preliminary injection fuel quantity, and to close again at the beginning of delivery of the main fuel quantity.

12. A fuel injection pump according to claim 11 wherein said pump comprises a pump inner space defining said relief space.

13. A fuel injection pump according to claim 1 wherein said cam driver means comprises a drive shaft having an axis, said pump piston and said pump working chamber being arranged perpendicular to the drive shaft axis, a cam ring having a cam track, and a roller shaft displaceable with said piston, one of said cam ring and said roller shaft revolving synchronously with said drive shaft, said pump further comprising a distributor piston coaxial with said drive shaft and connected thereto for joint rotation therewith, a distributor cylinder for slidingly receiving said distributor piston and having at least one injection bore communicating with the injection nozzle, a first bore communicating with said first pilot valve and a second bore communicating with one of said accumulator space and the second pilot valve; said distributor piston including a first annular groove for defining with said pump piston said pump working space, a distributor groove communicating said first annular groove with said injection bore, a second annular groove axially space from said first annular groove and overlapping said first and second bores, and an axial connecting groove for connecting said first and second axial grooves.

14. A fuel injection pump according to claim 13 wherein said distributor cylinder includes a radial bore, said pump further comprising a casing received in said radial bore and having radial bore means defining said accumulator space, said second pilot valve being secured to said casing.

15. A fuel injection pump according to claim 13 further comprising first radial bore means coaxial with said second bore of said distributor cylinder and defining said accumulator space, and second threaded bore means coaxial with said first bore means for threadably receiving said second pilot valve.

16. A fuel injection pump according to claim 2 comprising a pump inner space defining said fuel supply space.

17. A fuel injection pump according to claim 4 further comprising means for adjusting said stop.

* * * * *